(12) United States Patent
Thompson et al.

(10) Patent No.: US 10,496,509 B2
(45) Date of Patent: Dec. 3, 2019

(54) SYSTEMS AND METHODS FOR EVENT TRACKING AND HEALTH ASSESSMENT OF BATTERY-POWERED INFORMATION HANDLING SYSTEMS

(71) Applicant: Dell Products L.P., Round Rock, TX (US)

(72) Inventors: Rick C. Thompson, Cedar Park, TX (US); William D. Leara, Round Rock, TX (US); Nikhil M. Vichare, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 180 days.

(21) Appl. No.: 15/443,140

(22) Filed: Feb. 27, 2017

(65) Prior Publication Data

US 2018/0246552 A1    Aug. 30, 2018

(51) Int. Cl.
| | | |
|---|---|---|
| *G06F 1/26* | (2006.01) | |
| *G06F 1/32* | (2019.01) | |
| *G06F 11/30* | (2006.01) | |
| *G06F 9/4401* | (2018.01) | |
| *G06F 1/20* | (2006.01) | |
| *G06F 1/3206* | (2019.01) | |

(52) U.S. Cl.
CPC ............ *G06F 11/3058* (2013.01); *G06F 1/26* (2013.01); *G06F 1/206* (2013.01); *G06F 1/3206* (2013.01); *G06F 9/4401* (2013.01)

(58) Field of Classification Search
CPC ..................................... G06F 1/26; G06F 1/32
See application file for complete search history.

(56) References Cited

U.S. PATENT DOCUMENTS

| | | |
|---|---|---|
| 7,436,149 B2 | 10/2008 | Luo et al. |
| 7,595,609 B2 | 9/2009 | Wang et al. |
| 8,154,255 B2 | 4/2012 | Wang et al. |
| 9,015,514 B2 | 4/2015 | Sultenfuss et al. |
| 9,170,866 B2 | 10/2015 | Thornley et al. |
| 9,263,912 B2 | 2/2016 | Verdun et al. |

(Continued)

OTHER PUBLICATIONS

Dell, Resolve Hardware Issues Using ePSA or PSA Diagnostics and Guide to Error Codes, Printed from Internet Feb. 5, 2017, 27 pgs.

(Continued)

*Primary Examiner* — Phil K Nguyen
(74) *Attorney, Agent, or Firm* — Egan Peterman Enders Huston

(57) ABSTRACT

Systems and methods that may be implemented to monitor and record (store) information related to environmental conditions, operating conditions and/or events to which a battery-powered information handling system has been exposed while the battery powered information handling system is not powered. In one embodiment this stored environmental, system operating and/or event information may be made available to one or more system programmable integrated circuits at a following system restart or operating system (OS) boot. Such stored information may be used, for example, to determine one or more actions during a subsequent system restart or OS reboot, and/or to better enable root cause analysis of no-POST (power on self-test) type failures.

23 Claims, 5 Drawing Sheets

(56) References Cited

U.S. PATENT DOCUMENTS

| | | | |
|---|---|---|---|
| 9,496,932 B1 | 11/2016 | Prendergast et al. | |
| 2005/0017686 A1* | 1/2005 | Sakakibara | G01R 31/3679 320/132 |
| 2005/0099156 A1* | 5/2005 | Brenner | H02J 7/0036 320/116 |
| 2009/0124299 A1* | 5/2009 | Suzuki | H02J 7/0091 455/573 |
| 2011/0238262 A1* | 9/2011 | Fukuta | B60W 50/045 701/33.4 |
| 2012/0161718 A1* | 6/2012 | Nishida | H02J 7/0031 320/150 |
| 2013/0026983 A1* | 1/2013 | Yamamoto | H02J 7/0055 320/108 |
| 2015/0082071 A1* | 3/2015 | Kim | G06F 1/206 713/340 |
| 2016/0097820 A1 | 4/2016 | Thompson et al. | |
| 2016/0126762 A1 | 5/2016 | Verdun et al. | |
| 2016/0232069 A1 | 8/2016 | Thornley et al. | |
| 2017/0003984 A1 | 1/2017 | Gatson et al. | |
| 2017/0131362 A1* | 5/2017 | Wickham | G01R 31/3679 |

OTHER PUBLICATIONS

Thompson et al., "Information Handling System Battery Charge Management to Support Variable Increased Current Use Functions", U.S. Appl. No. 14/795,446, filed Jul. 9, 2015, 29 pgs.
Wikipedia, "Data Reduction", Printed From Internet Feb. 2, 2017, 2 pgs.
Intel, Support Assist for Enterprise Systems, Printed From Internet Feb. 1, 2017, 8 pgs.
Intel, Support Assist, Printed From Internet Feb. 1, 2017, 4 pgs.
Intel, Support Assist for Pcs and Tablets, Printed From Internet Feb. 1, 2017, 7 pgs.

* cited by examiner

SYSTEMS AND METHODS FOR EVENT TRACKING AND HEALTH ASSESSMENT OF BATTERY-POWERED INFORMATION HANDLING SYSTEMS

FIELD

This invention relates generally to information handling systems and, more particularly, to event tracking for battery-powered information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Disclosed herein are systems and methods that may be implemented to monitor and record (or store) information related to environmental conditions, operating conditions and/or events to which a battery-powered information handling system has been exposed while the battery powered information handling system is not powered. In one embodiment this stored environmental conditions, operating conditions and/or event information may be made available to one or more system programmable integrated circuits at a following system restart or operating system (OS) boot. In a further embodiment, such stored information may be used to determine one or more actions during a subsequent system restart or OS reboot. In another embodiment, access to such stored environmental, system operating and/or event information may be employed to better enable root cause analysis of no-POST (power on self-test) type failures and/or to reduce cannot duplicate failures (CNDs). In a further embodiment, proactive and/or predictive system health management may be made possible, e.g., reducing or eliminating CNDs making data for root-cause and reproducibility available in no-POST scenarios.

In another embodiment, root causes may be identified for real battery degradation or failure due to environmental exposure, even while information handling system circuitry to which the battery is coupled is powered off. For example, if a battery pack is regularly stored in a hot car in a Southwestern state of the United States, a programmable integrated circuit within the battery pack may be programmed to analyze and log the resulting high temperature exposure events, even while attached information handling system circuitry (e.g., tablet computer circuitry, notebook computer circuitry, cell phone circuitry, etc.) is powered off and/or even while circuitry of the battery pack is disconnected from (or unpaired with) any other information handling system circuitry. The logged exposure events may then be later retrieved (e.g., by internal diagnostic application on the next information handling system power up, by external diagnostic testing performed by a technician, etc.) and used to help identify and/or characterize an actual failure (e.g., as a verified field failure (VFF)).

Examples of environmental conditions or parameters that may be so monitored and recorded include, but are not limited to, ambient temperature, relative humidity, system geolocation (e.g., as measured by GPS coordinates and/or triangulation), etc. Examples of operating conditions that may be so monitored and recorded include, but are not limited to, battery operating conditions including battery state information such as battery current amplitude and/or current direction, battery voltage, battery temperature, battery charge cycles, battery state of charge, battery state of health, battery usage data such as charging and discharging data; and/or host system operating conditions such as processor operating speed data, system power management and cooling system settings, state of "system present" signal (e.g., a loss of the "system present" signal from a battery-powered information handling system indicates that either the battery was removed (or unpaired) from the main portion of the information handling system, and/or that system manipulation has occurred), etc. Examples of events that may be so monitored and recorded include, but are not limited to, acceleration or shock events (e.g., such as falls or impacts), system transportation (e.g., change in system location measured by GPS coordinates or triangulation), exposure to elevated temperature for extended time periods, high discharge current rate, combinations of battery voltage, battery current and/or battery temperature (e.g., elevated temperature event at full charge and/or high voltage causes more battery degradation than lower voltage), etc.

The disclosed systems and methods may be implemented in one embodiment using a battery-powered programmable integrated circuit of a smart battery pack to track the environmental conditions, operating conditions, and/or event information to which a battery pack and/or battery-powered information handling system is exposed, e.g., such as while a battery pack is not paired with any information handling system or while the remainder of the components of a paired information handling system have been powered OFF during system storage and/or transportation. In this way, environmental conditions, system operating conditions, and/or event information may be monitored and recorded (or logged) while an unpaired battery pack and/or a paired but unpowered battery-powered information handling system is exposed to harsh environmental conditions, harsh system storage conditions, rough system shipping/transportation conditions, etc.

The disclosed systems and methods may be implemented in another embodiment using a battery-powered programmable integrated circuit of a smart battery pack to track and record (on battery pack storage) the environmental conditions, operating conditions, and/or events to which a battery pack and/or a battery-powered information handling system has been exposed in the case where the battery-powered information handling system has undergone a no-boot or no-POST failure (or other condition in which the battery-powered information handling system cannot operate recover the tracked or recorded data from the battery pack). In such an embodiment, the battery pack may be removed from the first failed information handling system and paired with another second operative information handling system, which may then be used to recover and read/analyze the recorded environmental conditions, operating conditions, and/or event information that correspond to the failure event of the first information handling system to which the battery pack was paired when the system failed, e.g., thus enabling diagnosis of the cause for failure of the first system to allow proactive actions to be taken to correct any determined problems for future systems.

In one exemplary, environmental conditions, system operating conditions, and/or event information may be logged by a smart battery pack before the battery pack is first paired with any information handling system. In such an embodiment, the logged exposure/operating/event information up to the current point in time may be read and/or reported the first time the battery pack is paired with other components of an information handling system (e.g., at the first time the battery pack sees the "system present" signal which may be, for example, system ground applied from the information handling system to the battery pack system present pin when the battery pack is paired with the main portion of an information handling system). In such a case, the logged information may be analyzed and evaluated to ensure that the battery pack may be characterized as good (e.g., to determine that the battery pack has not been exposed to severe or damaging conditions or events such as high temperatures or mechanical shocks). If at this time it is determined that the logged information indicates that the battery may not be good, then further battery and/or system diagnostics may run before allowing the battery pack to become fully operational in the information handling system, e.g., even before the first system use by an end user.

In any case, this recorded and stored information may then be made available to at least one programmable integrated circuit of an information handling system at a following system restart or boot-up after a system (e.g., host processor) power "OFF" event or standby or sleep mode event. This may occur at the next subsequent power "ON" event or system wake up from standby or sleep mode event, and may be optionally used to make decisions regarding subsequent system operation, e.g., such as selection of a given system boot sequence, initiation of a system scan using pre-boot diagnostics, booting to a Service OS (if available), etc. In further embodiments, data on exceptions and off-time exposure may also be used to schedule operations after booting to an OS, and access to this data may be used to enable improved root-cause analysis of no-POST type failures and to reduce CND and/or diagnose poor battery performance/excessive battery cell degradation. Examples of battery-powered portable information systems that may be particularly prone to exposure to harsh environmental and storage conditions, as well as rough system shipping/transportation conditions include, but are not limited to, mobile devices such as notebook computers, MP3 players, personal data assistants (PDAs), cell phones, smart phones, cordless phones, tablet computers, "2-in-1" or convertible computers, etc. In such cases, best battery management practices are desirable for end-user computing (EUC) mobile devices.

In one embodiment, environmental, operational and/or event monitoring capabilities may be implemented by at least one battery-powered programmable integrated circuit (e.g., part of a battery management unit "BMU") that is responsible for controlling battery operation for a battery pack (e.g., smart battery pack) of a battery-powered information handling system. In this regard, a BMU may be battery-powered independent of the system by the battery pack cells and may be the last remaining operational system device, e.g., even after a system storage failure and/or motherboard failure. In any case, the BMU may be configured to monitor battery and/or system conditions (such as environmental exposure), operating conditions and/or events even when the information handling system is powered "OFF" (or is placed in a standby or sleep mode such as system power state S4 where the host programmable integrated circuit is otherwise unpowered) by a user. Thus, in this embodiment, monitoring and data collection capabilities implemented on a BMU may provide environmental, operating and/or event information that lead up to a failure of one or more other system components, e.g., such as in the case of no-boot and no-POST failure scenarios. This data may be essential in some cases for root-cause analysis and avoiding CND failure scenarios which occur when a user has an issued that cannot be later duplicated by a technician analyzing the now-normal functioning system.

In one embodiment, a battery-powered programmable integrated circuit may be coupled to employ one or more sensors during both power ON and power OFF system conditions to continuously track or monitor one or more environmental and/or other event parameters (e.g., battery temperature; battery current; relative humidity; changes in system geolocation; detected motion, acceleration, shocks, vibrations or impacts; airborne contaminants or particulates; system altitude; etc.). Such monitored parameters may be obtained, for example, from sensors or other circuitry (e.g., clock, microcontroller or other type of programmable integrated circuit) that are integrated within a smart battery pack itself. Example of such parameters include, but are not limited to, time/date information, battery temperature, relative humidity or other type sensors included within the battery pack itself. Other examples of monitored parameters include those obtained from sensors that are external to a smart battery pack, e.g., such as from sensors of other information handling system components, e.g., such as disk drive shock sensors or accelerometers, GPS sensor/processor, etc. Such internal and/or external sensors/processors may be powered (e.g., intermittently or continuously) by battery cells of the battery pack during times that an information handling system is powered "OFF" or other state with host programmable integrated circuit (e.g., host CPU) unpowered.

In any case, this monitored parameter information may be stored as data in non-volatile memory or other system storage, e.g., stored in memory of a BMU in a condensed format such as two-dimensional battery tables. Examples of two-dimensional battery tables may be found described, for example, in U.S. Pat. No. 9,263,912, which is incorporated herein by reference in its entirety for all purposes. In a further embodiment, exception events may be defined in code or otherwise in system storage. For example, a battery temperature exception event may be defined in BMU firmware code, e.g., such as an occurrence of a monitored battery temperature of over 70° C. for over one minute. Examples of other defined system exception events include, but are not limited to, relative humidity, detected shocks/vibration, altitude, and airborne contaminant levels outside acceptable levels for an information handling system in storage. In one embodiment, these defined exception events may be based on vectors specified by system fabricator/manufacturer/supplier user manual for the system, and may be measured given the BMU (or other suitable programmable integrated circuit) has access to the appropriate sensor/s for sensing the occurrence of the defined event.

Occurrence of exception events may, for example, be recorded in an exception log, e.g., maintained in a BMU memory. In such an embodiment, data from battery tables and/or exception log/s may be analyzed and used as indicators of particular issues or existing problems with the system. Further, even in the case that a system has no issues or problems, such data may be analyzed and used to pro-actively modify an operation (e.g., such as increase cooling fan speed and/or reduce host processor power level in response to recorded occurrence of high temperature, etc.) based on exposure to a given environmental condition and/or event occurrence that was monitored and recorded (e.g., by a BMU) while the remainder of the system (e.g., including host processor (CPU), embedded controller (EC), etc.) was in a power OFF state. In one embodiment, an EC of an information handling system may remain powered "ON" and fetching code when the host processor and other components of the information handling system are powered "OFF" as long as an AC adapter continues to supply power to the information handling system. However, the EC will also be unpowered along with the host programmable integrated circuit (e.g., CPU) and other components of a powered "OFF" information handling system when no AC adapter is supplying power to the information handling system.

In one embodiment, stored environmental, operational and/or event information may be accessed for analysis (e.g., after a system failure). In this regard, such information may be internally accessed and analyzed by at least one programmable integrated circuit of the information handling system itself (e.g., on the next system restart and/or OS reboot), and/or may be accessed and analyzed by a programmable integrated circuit external to the information handling system (e.g., using a diagnostic tool executing on at least one external programmable integrated circuit that accesses the stored information in system storage via wireless or wired network connection and/or via a data communication bus such as USB). In one exemplary embodiment, an internal system embedded controller (EC) and system BIOS code executed by host integrated circuit (CPU) may together read the stored environmental, operational and/or event information from system storage (e.g., BMU memory) and pass it to an OS level service application that is requesting the information. Examples of such OS level service applications include automated data collection (e.g., health check) and support service applications such as the Dell Data Vault (DDV) and Dell SupportAssist applications available from Dell Products, L.P. of Round Rock, Tex. Such OS level service applications may analyze the retrieved environmental, operational and/or event information (e.g., to determine failure cause, identify needed configuration changes to avoid future failures, etc.), and may optionally interface with external technical support for further analysis and action, e.g., via Internet, corporate intranet, etc.

In one respect, disclosed herein is a battery system, including: one or more rechargeable battery cells configured to be coupled to provide electrical current to a system load of an information handling system when the battery system is paired with the information handling system; battery system storage; and at least one programmable integrated circuit coupled to the battery system storage and the one or more battery cells. The programmable integrated circuit of the battery system may be programmed to be powered by the one or more rechargeable battery cells to perform the following while the battery system is not paired with an information handling system or while the battery system is paired with an information handling system with a host programmable integrated circuit of the information handling system in an unpowered condition: sense at least one of environmental conditions, operating conditions or event occurrences to which the battery system and/or information handling system is exposed; and record the sensed environmental conditions, operating conditions or event occurrences as sensed information on the battery system storage. The at least one battery system programmable integrated circuit may be further programmed to provide the sensed information from the battery system storage to at least one programmable integrated circuit of a paired information handling system when the battery system is next paired with an information handling system having a host programmable integrated circuit in powered condition.

In another respect, disclosed herein is an information handling system, including: a system load including a host programmable integrated circuit programmed to execute an operating system for the information handling system; and a battery system paired with the information handling system, the battery system being separate from the system load and including: one or more rechargeable battery cells coupled to provide electrical current to the system load of the information handling system, battery system storage, and at least one programmable integrated circuit coupled to the battery system storage and the one or more battery cells. The programmable integrated circuit of the battery system may be programmed to be powered by the one or rechargeable battery cells to perform the following while the battery system is not paired with the information handling system or while the battery system is paired with the information handling system with the host programmable integrated circuit in an unpowered condition: sense at least one of environmental conditions, operating conditions or event occurrences to which the battery system and/or information handling system is exposed; and record the sensed environmental conditions, operating conditions or event occurrences as sensed information on the battery system storage. The battery system programmable integrated circuit may be further programmed to provide the sensed information from the battery system storage to at least one programmable integrated circuit of the information handling system the next time the host programmable integrated circuit is placed in powered condition while the battery system is paired with the information handling system.

In another respect, disclosed herein is a method, including operating at least one programmable integrated circuit of a battery system having one or more rechargeable battery cells to perform the following steps while the battery system is not paired with an information handling system or while the battery system is paired with an information handling system with a host programmable integrated circuit of the information handling system in an unpowered condition: sense at least one of environmental conditions, operating conditions or event occurrences to which the battery system and/or information handling system is exposed; record the sensed environmental conditions, operating conditions or event occurrences as sensed information on storage of the battery system; and then provide the sensed information from the battery system storage to at least one programmable integrated circuit of the information handling system when the battery system is next paired with an information handling system with the host programmable integrated circuit in powered condition.

DESCRIPTION OF ILLUSTRATIVE EMBODIMENTS

Figure 1:
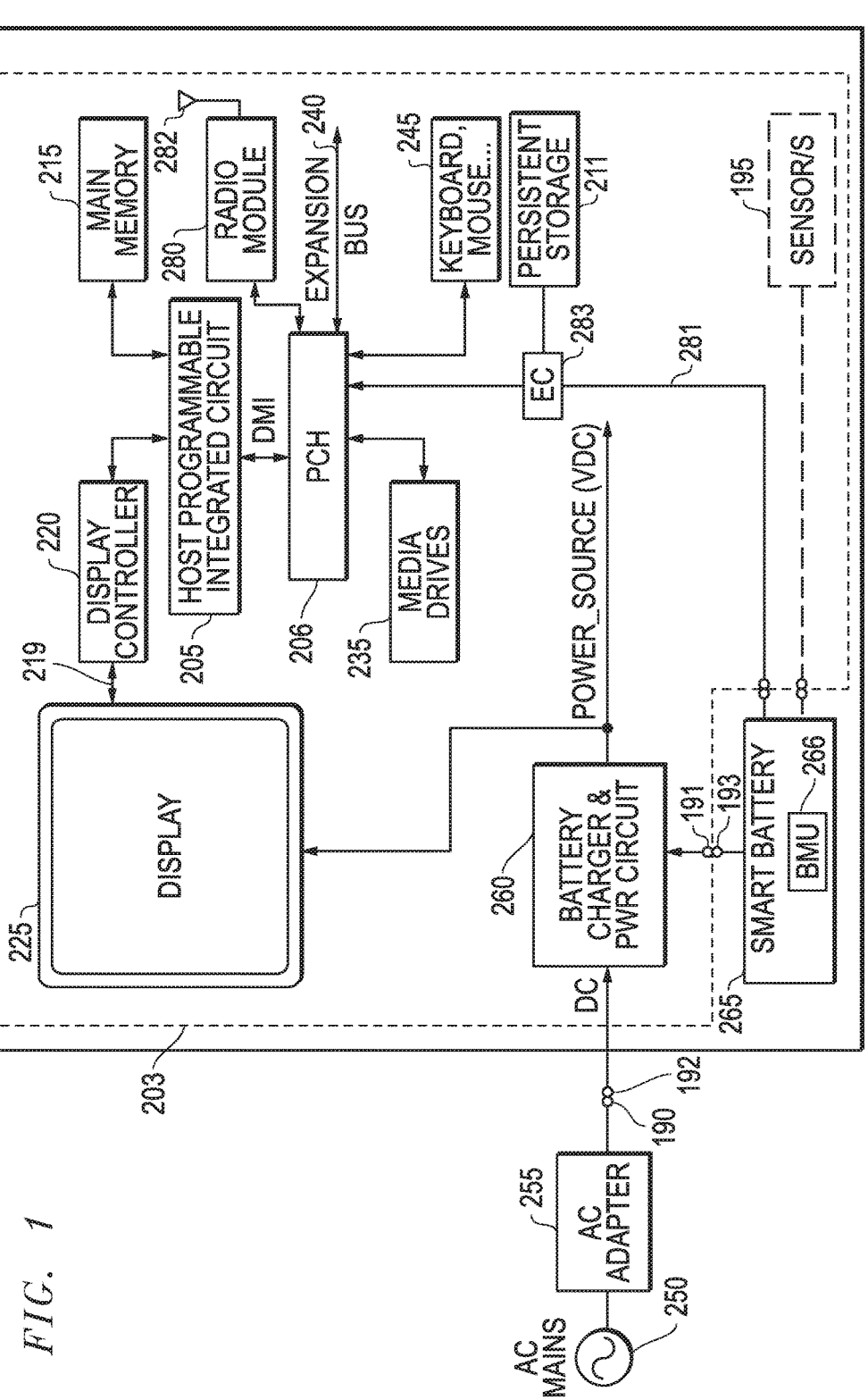
FIG. 1 illustrates a block diagram of an information handling system according to one exemplary embodiment of the disclosed systems and methods.

FIG. 1 is a block diagram of an information handling system 200 (e.g., mobile portable information handling system such as notebook computer, MP3 player, personal data assistant (PDA), cell phone, smart phone, cordless phone, tablet computer, "2-in-1" or convertible computer, etc.) as it may be configured with various components within an outer chassis enclosure 201 (e.g., tablet computer body or smartphone body, hinged notebook computer base and/or lid, etc.) according to one exemplary embodiment of the disclosed systems and methods. It will be understood that the embodiment of FIG. 1 is exemplary only, and that other in other embodiments an information handling system may include additional, fewer and/or alternative components suitable for a given application including other programmable integrated circuits such as discrete graphics processing units (GPUs), etc. As shown in FIG. 1, information handling system 200 of this exemplary embodiment includes a host processing device or host programmable integrated circuit 205 (e.g., CPU such as an Intel Pentium series processor, an Advanced Micro Devices (AMD) processor or one of many other processors currently available) which may be optionally coupled together with a platform controller hub (PCH) 206 for some applications. Other examples of programmable integrated circuits 205 include any other suitable one or more programmable integrated circuits such as controller, microcontroller, microprocessor, ASIC, programmable logic device "PLD" such as FPGA, complex programmable logic device "CPLD", etc.

In the illustrated embodiment, host programmable integrated circuit 205 may be configured to execute an operating system (OS) such as Windows-based operating system, Linux-based operating system, etc. System memory 215 (e.g., DRAM) and a display controller 220 may be coupled as shown to host programmable integrated circuit 205, and a display device 225 (e.g., video monitor) may be coupled to display controller 220 to provide visual images (e.g., via graphical user interface) to the user, e.g., via eDP components 219 such as eDP cable and eDP connector. Media drives 235 may be coupled as shown to host programmable integrated circuit 205 via PCH 206 to provide permanent or non-volatile storage for the information handling system.

Still referring to FIG. 1, an optional expansion bus 240 may be coupled to PCH 206 to provide the information handling system with additional plug-in functionality. Expansion bus 240 may be a PCI bus, PCI Express bus, SATA bus, USB or virtually any other expansion bus. Input devices 245 (e.g., such as a keyboard, touchpad, mouse) may be coupled via PCH 206 to host programmable integrated circuit 205 to enable the user to interact with the information handling system. In other mobile applications, such as convertible computer, tablet computers and smart phones, a touchscreen may additionally or alternatively be provided for both presenting a graphical user interface (GUI) and for accepting user input. A radio module 280 may be coupled to host programmable integrated circuit 205 via PCH 206, with at least one antenna element 282 coupled to radio module 280 as shown for wireless reception and transmission, e.g. to enable wireless LAN and/or cellular data communications. An embedded controller (EC) 280 may also be coupled to PCH 206 as shown, and may be configured to perform various tasks such as battery and power management, I/O control, etc. Persistent storage 211 (e.g., embedded and partitioned flash memory, Electrically Erasable Programmable Read Only Memory—EEPROM, etc.) may be coupled to EC 280 for storing persistent information for EC 280.

In the particular embodiment of FIG. 1, information handling system 200 is coupled to an external source of power, namely AC mains 250 through AC adapter 255. It will be understood that external power may be alternatively provided from any other suitable external source (e.g., external DC power source) or that AC adapter 255 may alternatively be integrated within an information handling system 200 such that AC mains 250 supplies AC power directly to information handling system 200. As shown AC adapter 255 is removably coupled to, and separable from, battery charger/power circuit 260 of information handling system 200 at mating interconnection terminals 190 and 192 in order to provide information handling system 200 with a source of DC power to supplement DC power provided by battery cells of a battery system in the form of smart battery pack 265, e.g., lithium ion ("Li-ion") or nickel metal hydride ("NiMH") battery pack including one or more rechargeable batteries and a BMU that includes, for example, an analog front end ("AFE"), storage (e.g., non-volatile memory) and microcontroller. Battery charger/power circuit 260 of information handling system 200 may also provide DC power for recharging battery cells of the battery system 265 during charging operations.

As further shown in FIG. 1, a battery system data bus (SMBus) 281 may be coupled to smart battery pack 265 by interconnection terminals to provide real time and/or stored information from BMU 266 of smart battery pack 265 to EC 280 and to other components such as programmable integrated circuit 205. Examples of such information include, but are not limited to, operating conditions (e.g., battery operating conditions including battery state information such as battery current amplitude and/or current direction, battery voltage, battery charge cycles, battery state of charge, battery state of health, battery temperature, battery usage data such as charging and discharging data; and/or host system operating conditions such as processor operating speed data, system power management and cooling system settings, state of "system present" pin signal, environmental information (e.g., such as ambient temperature, relative humidity, system geolocation measured by GPS or triangulation, time and date, etc.), and event occurrences (e.g., acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.). In one embodiment, loss of "system present" pin signal from a paired information handling system indicates the battery was removed (or unpaired) from the main portion 203 of information handling system and/or other system manipulation has occurred. As further shown, BMU 266 may be coupled to one or more optional sensors 195 which are described elsewhere herein.

In one embodiment, when a battery system 265 of a portable information handling system 200 is optionally provided as a replaceable smart battery pack, it may be configured for insertion (paring with main portion 203) and removal (un-pairing with main portion 203) from a corresponding battery pack compartment defined within the chassis 201 of the information handling system 200 (e.g., such as plastic and/or metal enclosure of a notebook computer, tablet computer, convertible computer smart phone, etc.), and may be provided with external power and data connector terminals 193 for contacting and making temporary interconnection with mating power connector terminals and data connector terminals 191 provided within the battery pack compartment to provide power to the system load (i.e., power-consuming components) of a main portion 203 of the information handling system 200, as well as to exchange data and system present signal with one or more processing devices of the information handling system. Further information on smart battery packs and BMUs may be found, for example, in U.S. Pat. Nos. 7,595,609 and 7,436,149, each of which is incorporated herein by reference in its entirety for all purposes. Further information on battery-powered information handling systems may be found, for example, in U.S. Pat. No. 9,496,932, which is incorporated herein by reference in its entirety for all purposes. Alternatively, a smart battery pack may be a non-replaceable or permanent battery pack that is enclosed (or captured) within an information handling system chassis, e.g., such as a tablet computer or smart phone. In one embodiment, external power and data connector terminals 193 of such a captured battery pack may be optionally soldered to mating power connector terminals and data connector terminals 191 provided within the battery pack compartment.

Figure 2:
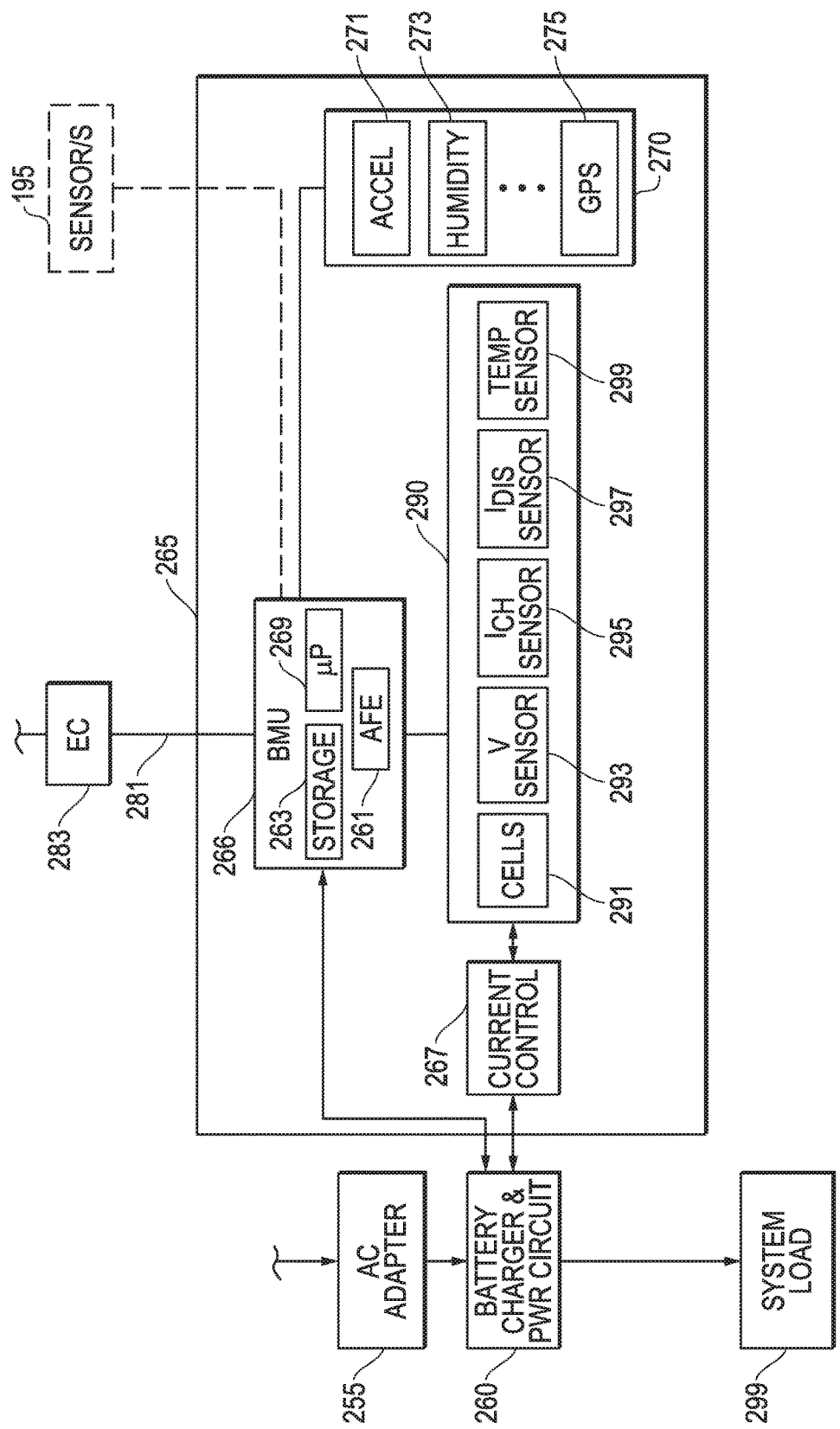
FIG. 2 illustrates a battery system according to one exemplary embodiment of the disclosed systems and methods.

FIG. 2 illustrates a battery system 265 in the form of a smart battery pack as it may be coupled to receive DC power from battery charger/power circuit 260 during charging, and coupled to provide DC power to system load 299 (i.e., power-consuming components) of information handling system 200 during battery operation of system 200. As shown, a battery system 265 may include a battery unit 290 that includes one or more rechargeable battery cells 291 as well as one or more sensors, such as temperature sensor 299, voltage sensor 293, charging current sensor 295, and a discharge current sensor 292, etc. When at least partially charged, battery cells 291 are configured to not only power other components of information handling system 200 (i.e., when battery power/data terminals 193 are electrically connected to system power/data terminals 191), but also to power components of BMU 266 even when the remainder of the power-consuming components of system 200 are powered OFF and when battery pack power/data terminals 193 are not electrically connected to system power/data terminals 191.

In the embodiment of FIG. 2, battery system 265 is provided with battery current control circuitry 267 to control flow of charge current to battery cell/s 291 of battery pack 265, and to also control flow of discharge current from battery cell/s 291 of battery pack 265. In one embodiment, the battery current control circuitry 267 may include charge and discharge circuitry in the form of two field effect transistors ("FETs") coupled in series between battery cell/s 291 and battery charger/power circuit 260 (and optional battery terminal 193). The FETs of battery current control circuitry 267 may include a charge FET switching element that forms a part of a charge circuit that is controlled by components (e.g., programmable integrated circuit 269 and/or AFE 261) of BMU 266 to allow or disallow charge current to the battery cell/s 291, and a discharge FET switching element that forms a part of discharge circuit that is controlled by components (e.g., programmable integrated circuit 269 and/or AFE 261) of BMU 266 to allow or disallow discharge current from the battery cell/s 324. Further information on current control circuitry and battery system charge/discharge operation may be found in U.S. Pat. No. 8,154,255, which is incorporate herein by reference in its entirety for all purposes.

In the illustrated embodiment, temperature sensor 299, voltage sensor 293, charging current sensor 295, and a discharge current sensor 292 are used to respectively provide to the BMU 266 the temperature of the battery, the voltage in the battery, and the current going through the battery during charging and discharging. In one embodiment, the temperature sensor 299 may detect both high and low temperature conditions that may affect the battery life. As further shown, when AC adapter 255 is connected to AC mains 250, the battery charger 260 charges the battery cells 291 of rechargeable smart battery pack 265 as directed by a programmable integrated circuit 269 (e.g., microcontroller or microprocessor) of BMU 266. Although a battery unit 290 is illustrated that includes cells 291 and sensors 293, 295, 297 and 299, it will be understood that cells 291 and sensors may be alternatively provisioned outside of a battery unit and coupled to BMU 266 in any other suitable manner internal or external to battery system 265.

As further shown in FIG. 2, battery system 265 may optionally include one or more other sensors 270, e.g., integrated circuits such as accelerometer 271, relative humidity sensor 273, global positioning system (GPS) sensor/receiver 275, or barometric altimeter sensor or airborne particulate sensors such as aerosol impactor or laser particle counter (not shown), etc. However, it will be understood that any one of other sensors 270 may be alternatively provisioned as sensors 195 coupled by interconnection terminals to BMU 266 but positioned outside of, or external to, battery system 265. For example, one or more sensors 195 may be provided at any location outside of battery system 265 and within chassis enclosure 201 of information handling system 200 that is suitable for sensing a given environmental parameter, e.g., such as air temperature within chassis enclosure 201, ambient air temperature external to chassis enclosure 201, relative humidity within chassis enclosure 201, ambient relative humidity external to chassis enclosure 201, airborne particulates within chassis enclosure 201, airborne particulates external to chassis enclosure 201 etc.

Still referring to FIG. 2, BMU 266 may also include battery system storage 263 (e.g., storage device such as non-volatile random access memory "NVRAM", volatile or dynamic random access memory "DRAM", any other form of suitable non-volatile and/or volatile memory, etc.), as well as analog front end (AFE) 261 that are coupled to programmable integrated circuit 269. AFE 261 may be present, for example, to receive and/or condition any non-digital sensor inputs. In one embodiment, programmable integrated circuit 269 of BMU 266 may perform measurement of current and voltage, as well as calculation of current capacity of the battery and other battery-related calculations and battery charging/discharging control such as described, for example, in U.S. Pat. Nos. 8,154,255; 9,263,912; 9,015,514; United States Patent Application Publication Number 2016/0126762; United States Patent Application Publication Number 2016/0097820; and U.S. patent application Ser. No. 14/795,446 filed Jul. 19, 2015, each of which is incorporated herein by reference in its entirety for all purposes. BMU programmable integrated circuit 269 may also perform measurement of environmental, system operating conditions, and/or event information using sensors of battery unit 290 and other sensors 270 and/or 195 that may be present, as well as recording or storing this measured data in storage 263 of BMU 266. However, it will be understood in other embodiments, one or more other programmable integrated circuits of system 200 may additionally or alternatively perform measurement of environmental, system operating conditions, and/or event information, as well as recording this information in storage 263 and/or other storage components of system 200.

Figure 3:
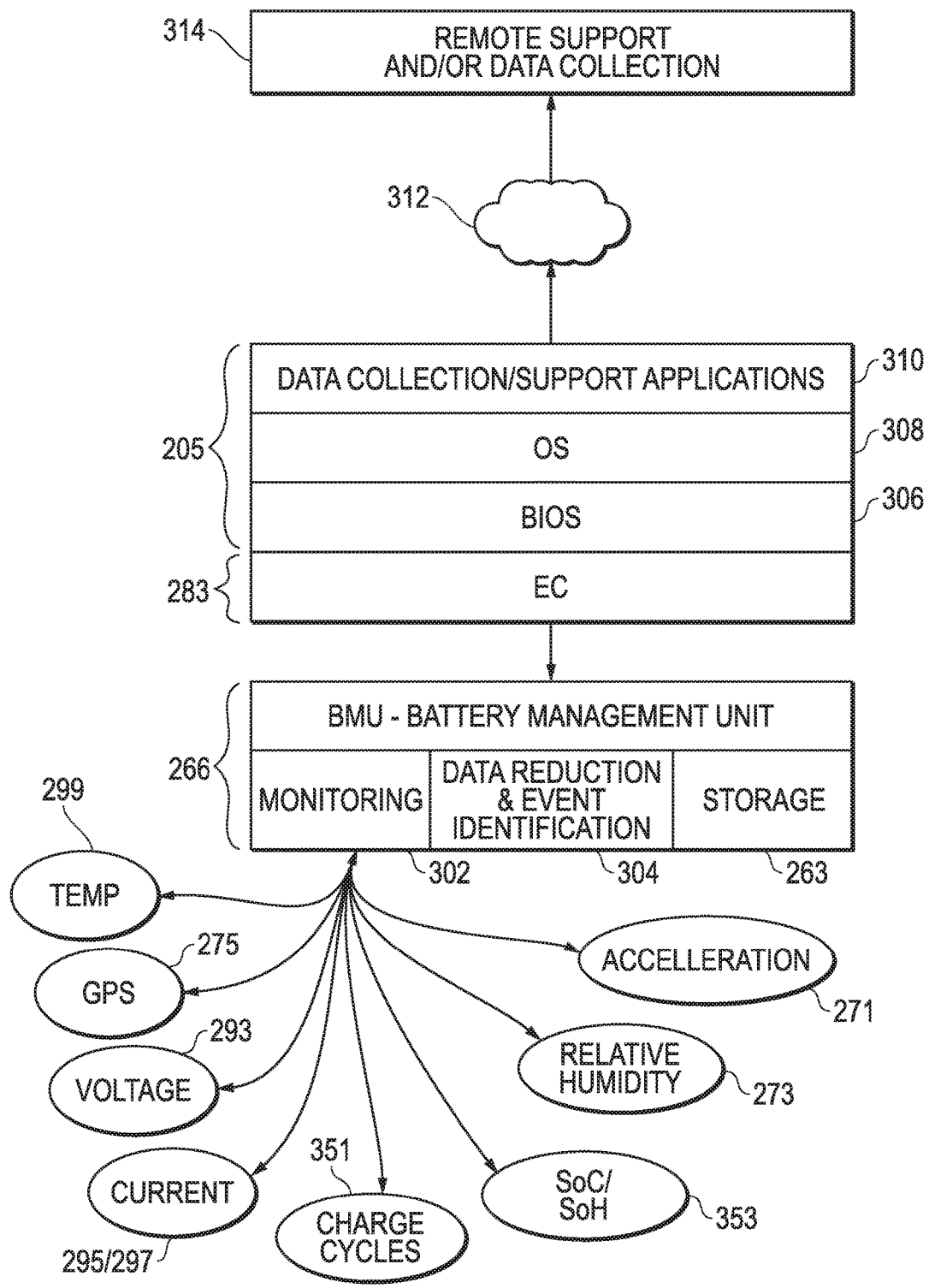
FIG. 3 illustrates a block diagram that shows interrelation of various logic and hardware layers of an information handling system according to one exemplary embodiment of the disclosed systems and methods.

FIG. 3 illustrates a block diagram that shows interrelation of various logic and hardware layers of an information handling system 200 according to one exemplary embodiment of the disclosed systems and methods. As shown in FIG. 3, programmable integrated circuit 269 of BMU 266 may be coupled to perform sensor monitoring tasks 302 that include monitoring sensor inputs and/or data or information provided by various sensors such as described in relation to FIG. 2. Monitoring tasks 302 may also include using a battery gas gauge to monitor battery charge cycles 351, state of charge (SoC) and/or battery cell state of health (SoH) 353, and/or other monitored parameter such as impedance. In this regard, battery cell SoC is present battery cell capacity/full battery cell charge capacity, and battery cell state of health (SoH) 353 is present full battery cell charge capacity/design battery cell charge capacity 353.

As further shown in FIG. 3, storage 263 of BMU 266 may be present to store recorded environmental, system operating and/or event information which in one embodiment may be provided by data reduction and/or event identification tasks 304 performed by programmable integrated circuit 269. Data reduction tasks may include, for example, processing and/or transforming data received or derived in real time from sensors (e.g., such as one or more of the sensors illustrated and described in relation to FIGS. 2 and 3) into a data form for further processing, recording in storage 263 of BMU 266 (e.g., as part of a BMU exception log), and/or export from BMU 266 to other components of system 200, e.g., such as embedded controller (EC) 283, host programmable integrated circuit 205, etc. In this regard, data reduction tasks may include performing one or more operations on monitored sensor data including, but not limited to, upscaling, editing, sorting, coding, collating, tabulating, summarizing, smoothing, interpolation, etc. Event identification tasks may in one embodiment include inspecting or reviewing reduced data that is recorded on Battery system storage 263 to determine if one or more predefined event types have occurred by comparing environmental, system operating and/or event information to predefined exception event criteria, e.g., that may be stored in storage 263. Any identified exception events may be recorded in a BMU exception log on storage 263 by event reduction and event identification logic 304.

In one embodiment, severity of each identified event may also be optionally categorized by event reduction and event identification logic 304 and recorded in a BMU exception log on storage 263. For example, a sensed battery temperature of greater than 75° C. for a defined extended duration of time (e.g., for greater or equal to five minutes) may be predefined as a high severity exception event, whereas a sensed battery temperature of greater than 75° C. for less than the defined extended duration of time may be predefined as a low severity exception event. Rather than severity, it is also possible that certain types of exception events may be pre-designated for diagnostic testing with a diagnostic flag (e.g., "1"), while other type of events are designated with a no-diagnostic flag (e.g., "0") to allow normal booting. It will be understood that it is alternatively possible that severity of a given exception event may be determined by another programmable integrated circuit/s of system 200 (e.g., such as EC 283 and/or host programmable integrated circuit 205) based on information provided in a BMU exception log.

Table 1 below includes examples of existing or predefined criteria for identifying and/or categorizing exception events that have occurred since the last OS reboot or system restart. The information of Table 1 may be stored, for example, in a lookup table or other data structure on Battery system storage 263 and compared to sensed and/or recorded environmental, system operating and/or event information to identify and/or categorize events that may be recorded in a BMU exception log. These tasks may be performed, for example, continuously or on a real time basis during system operation by data reduction and event identification 304 executing on BMU 266. In the example of Table 1, each event has an identification number, event occurrence criteria, and optional event severity criteria (or alternatively diagnostic flag indication), the latter of which may be used to categorize the severity of a given identified event that has occurred since the last reboot or restart. It will be understood that event severity criteria may alternatively be defined in other ways, e.g., such as defined in the system basic input/output system (BIOS) firmware. If defined in system BIOS firmware, severity event criteria may be externally changed using a BIOS firmware update such as when battery cells 291 age or wear out, and/or as other anomalies are discovered.

It will be understood that the event criteria of Table 1 is exemplary only, and that additional and/or other types (and/or values) of event criteria may be predefined as appropriate or desired for a given information handling system configuration and application. Examples of types of events that may have criteria so predefined include, but are not limited to, a monitored temperature that is greater than a predefined threshold temperature value, an elapsed time that is greater than a predefined threshold time value, a system present pin signal toggle between system present and system not present, a change in battery cell voltage that is greater than a predefined threshold voltage change value while the information handling system is powered "OFF" (e.g., while the host processor is unpowered and no external charge source such as AC adapter is present which could therefore indicate a current short), etc. For example, battery degradation is impacted by temperature, duration of exposure to temperature, and whether the battery is operating (battery cells 291 are discharging and/or charging) or non-operating. Further, if the battery is operating, the battery cell degradation impact is different for charging and discharging conditions.

TABLE 1

| Event Number | Event Criteria | Event Severity |
| --- | --- | --- |
| 1 uint16 (0x122) | Exposure to temperature greater than 80° C. | High |
| 2 uint16 (0x124) | Charge time at temperature over 50° C. for a period of one minute or greater | High |
| 3 uint16 (0x126) | Charge time at temperature below 5° C. for a period of one minute or greater | Low |
| 4 uint16 (0x128) | Exposure to temperature less than −15° C. | Low |
| 5 uint16 (0x12a) | Exposure to calculated impact greater than X $G_{RMS}$ (where X = a defined impact threshold value of root-mean-square acceleration ($G_{RMS}$)) | High |
| 6 uint16 (0x12c) | Number of times Battery reaches 0% relative state of charge (RSOC) | <2 times = Low<br>≥2 times = High |
| 7 uint16 (0x12e) | Time spent in E4* mode 1 | <1 minute = Low<br>≥1 minute = High |
| 8 uint16 (0x120) | Time spent in E4* mode 2 | <1 minute = Low<br>≥1 minute = High |
| 9 uint16 (0x132) | Time spent in E4* mode 3 | <1 minute = Low<br>≥1 minute = High |
| 10 uint16 (0x134) | Time spent in E4* mode 4 | <1 minute = Low<br>≥1 minute = High |

*Where E4 modes correspond to different charge control algorithms (e.g., standard charge, fast charge, limited charge to improve battery lifespan)

In one embodiment, BMU 266 may be coupled to provide identified event information (e.g., as an event log including a data record that identifies event occurrence and optional severity of each event as defined in Table 1) and/or reduced data stored on Battery system storage 263 to one or more other programmable integrated circuits (e.g., EC 283, host programmable integrated circuit 205, etc.) of system 200. This identified event information may include events identified by data reduction and event identification 304 of BMU 266 that occur while the host information handling system 200 is powered "OFF" and/or powered "ON". Logic executing on one or more such other programmable integrated circuits may further process and/or respond to the event identification information and/or reduced data provided from BMU 266. As shown, such logic may include EC firmware executing on EC 283 and/or may include logic executing on host programmable integrated circuit 205 such as system BIOS 306, OS 308, application/s 310 (e.g., such as data collection and/or support applications), etc. It is also possible that the same types of collected data and/or other information (e.g., such as identified events or support requests based on collected data or identified events) may be provided to off-host remote entities 314 (e.g., such as computer servers executing corporate or manufacturer/fabricator/supplier support programs, system administrator systems, monitoring systems, etc.) across a network 312 (e.g., Internet, corporate intranet, etc.) and/or a communication bus. In one embodiment, the collected data and/or other information may be aggregated with other system information (e.g., CPU data, EC data, etc.) that is passed off-host to remote entities 314 for analysis. Such remote entities 314 may then optionally take one or more actions based on the nature of this provided information and/or may record the provided information, e.g., for future analysis.

Figure 4:
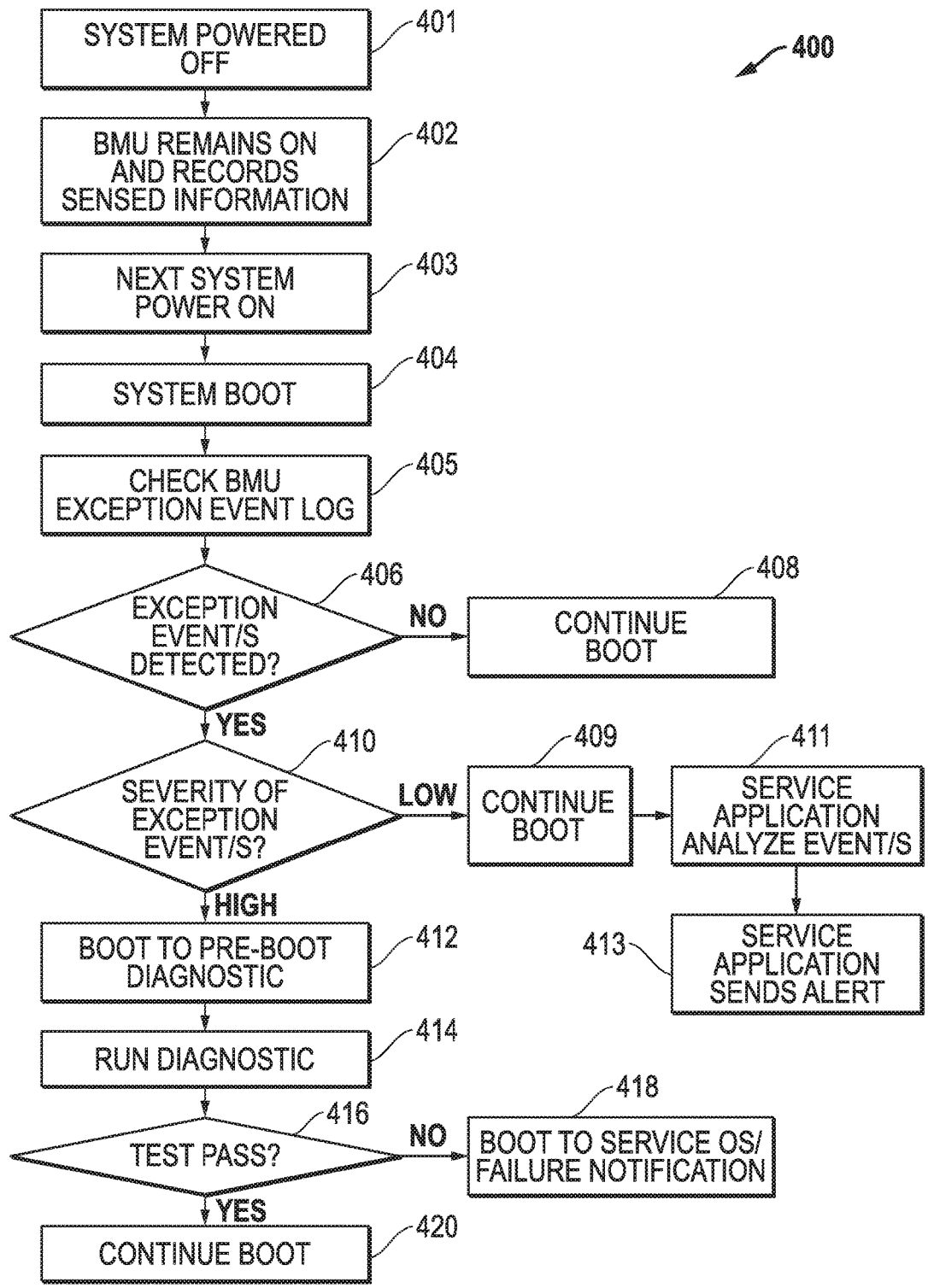
FIG. 4 illustrates methodology according to one exemplary embodiment of the disclosed systems and methods.

FIG. 4 illustrates a methodology 400 that may be implemented in one exemplary embodiment to determine boot sequence of an information handling system based on existence and/or severity of identified exception event/s that occurred during a previous system OFF condition. As shown in FIG. 4, methodology 400 starts in step 401 when system 200 is powered OFF. At this time, most system power components (e.g., host programmable integrated circuit 205, EC 283, etc.) are powered OFF. However, at this time programmable integrated circuit 269 of BMU 266 remains powered ON (e.g., using power supplied from battery pack battery cells 291 and/or from charging current provided by battery charger/power circuit 260) as shown in step 402. Also in step 402, programmable integrated circuit 269 of BMU 266 receives and records environmental, system operating conditions, and/or event occurrence as sensed information on to Battery system storage 263 in a manner as described elsewhere herein.

Next, in step 403, system 200 is next again powered ON (e.g., host programmable integrated circuit 205, EC 283, etc. are again powered on) and proceeds to system boot in step 404. During the system boot process of step 404, a BMU exception log may be provided from BMU 266 to host programmable integrated circuit 205 (e.g., via EC 283 upon request from host programmable integrated circuit 205 or in any other suitable manner). Then in step 405, BIOS 306 executing on host programmable integrated circuit 205 may check the provided BMU exception log to determine in step 406 if any BMU exception events have occurred since the last OS reboot. If not, then methodology 400 may proceed with reboot of the OS 308 in step 408. However, if one or more exception events are determined to have occurred since the last OS reboot, then methodology 400 proceeds to step 410 where the severity of the exception event/s (or alternatively diagnostic/no-diagnostic flag/s) are assessed. As described in relation to Table 1 above, BMU 266 may compare predefined event criteria on a continuous or real time basis to sensed and/or recorded environmental, system operating and/or event information to identify and categorize severity of exception events that occur prior to a system shut down and/or failure. In one embodiment, the identity and severity of each such exception event may be recorded in the BMU exception log that is later passed to host programmable integrated circuit 205 and then analyzed in steps 406 and 410 on the next reboot. However, in other embodiments, severity of a given exception event may be determined by EC 283 and/or host programmable integrated circuit 205 based on event information provided in the BMU exception log. In another embodiment, step 410 may be omitted and methodology 400 proceed directly from step 406 to 412 upon detection of the presence of any type of exception event in step 406.

Returning to step 410, if the BMU exception log includes only low severity (or no-diagnostic testing flag) BMU exception event/s, then methodology 400 continues normal OS reboot in step 409, and once the OS 308 is booted then proceeds to step 411 where a service application (e.g., such as an OS level health check service application like Dell DDV) reads and analyzes the low severity BMU exception event/s and then may send an alert notification in step 413, e.g., to a local OS level support application (e.g., such as Dell SupportAssist application) and/or to other health provider or support entity (e.g., such as to remote support and/or data collection application 314 executing on a remote server via network 312) for corrective action and/or resolution to correct errors. Such corrective action or resolution may include alerting a user of the system 200 of the low severity event/s and providing solution/s to correct any underlying problems (e.g., hardware and/or software/firmware problems) that have caused the event/s. Such solutions may include actions like replacing a defective battery pack 290 that has failing cell/s, replacing or upsizing ineffective or insufficient system cooling fan/s, changing CPU power level (e.g., changing turbo or overclocking profiles), etc. Further information on OS health check service applications and corrective actions may be found in U.S. Pat. No. 9,170,866 and United States Patent Application Publication Number 2017/0003984, each of which is incorporated herein by reference in its entirety.

However, if the BMU exception log is found in step 410 to contain one or more high severity (or diagnostic flag) exception events in step 410, then methodology 400 proceeds to step 412, where the system first automatically boots directly into a pre-boot diagnostic routine (e.g., existing normally user-activated diagnostic module of system BIOS executed by host programmable integrated circuit 205), and then runs a health scan or other diagnostics according to the pre-boot diagnostic routine in step 414. Such pre-boot diagnostics may include, for example, hardware diagnostic testing such as CPU operation (e.g., machine check exception presence, thermal, cache, speed) testing; random access memory integrity testing; battery health, capacity and output capability testing; battery charger operation testing; system storage (e.g., solid state, hard drive and optical drive) testing; system board and motherboard operation (e.g., CMOS battery, input/output, clock, timers and interrupt) testing; input/output device (e.g., touchpad, mouse, keyboard, display, touchscreen) operation testing; graphics card operation testing; cooling fan operation testing; analysis of event logs for presence of failure records; etc. Examples of such pre-boot diagnostic routines include, but are not limited to, PSA and ePSA diagnostic routines available from Dell Products L.P. of Round Rock, Tex.

After pre-boot diagnostics are completed in step 414, methodology 400 proceeds to step 416 where it is determined if the diagnostic testing of step 414 has passed (e.g., no system component failures or errors detected), then methodology 400 continues to normal OS reboot in step 420. However, if the diagnostic testing of step 414 has failed (e.g., one or more system component failures or errors detected), then methodology 400 proceeds to step 418 where the system boots to a Service OS and/or provides a failure notification (e.g., such as pre-boot diagnostic error code that indicates nature of the failure/s together with corresponding high severity event/s) to the user (e.g., via display 225) so that the user may determine course of action for resolution and correction of the cause of the failure/high severity event. Such resolution may include, for example, replacing non-operational battery pack 265, replacing damaged system or mother board, replacing damaged storage device 235, replacing damaged volatile or non-volatile memory 215 or 211, replacing non-operation cooling fan/s or temperature sensor/s, etc. With regard to step 418, a service OS refers to a functional but stripped-down OS that is distinct and secondary from the main OS that the end-user uses on a daily basis (e.g., such as main Windows 10 OS). The purpose of a service OS is to repair the main OS when the main OS is in any way broken and/or unable to boot. This service OS resides on a separate location on the hard disk drive from the main OS and may be triggered (e.g., by system BIOS) when a problem is detected with the main OS. In one embodiment of step 418 described above, the BMU 266 (and/or information provided by the BMU 266) may trigger the service OS when diagnostics of step 414 have failed, and redirect the boot process from the main OS to a secondary boot path that includes the service OS. After the service OS is booted, the user may run diagnostics applications in an attempt to debug and resolve the problem/s, e.g., with the main OS or otherwise.

It will be understood that the illustrated steps of methodology 400 are exemplary only, and that any other combination of additional, fewer and/or alternative steps may be employed that is suitable to monitor and record information related to environmental conditions, operating conditions and/or events to which a battery-powered information handling system has been exposed while the battery powered information handling system is not powered, and to make this information available for diagnostic use by one or more system programmable integrated circuits at a following system restart or operating system (OS) boot. For example, in one exemplary embodiment, post-boot operation task/s (e.g., after the OS is booted up) may be determined based on the most recent system off-time. For example, BMU 266 of battery pack 265 may record in its data and/or event tables the time (e.g., calendar date and time of day) when the OS 308 was last booted or when the host programmable integrated circuit 205 was last turned OFF, and may then calculate the elapsed off time until the next system and OS reboot. If this elapsed time since last reboot or system shutdown exceeds a predefined threshold duration (e.g., 30 days or any other suitable duration threshold), then upon the next OS boot, the fact that the time duration has exceeded the predefined time duration threshold may be passed as a message from BMU 266 to the OS 308 so that OS 308 may then respond by applying a specific defined update policy based on exceedance of the predefined threshold since the last boot or shut-down, e.g., OS 308 may prioritize update of the virus signature above all other software updates (in a manner which would not be done in absence of the message from BMU 266). In another example, value of the recorded elapsed off-time may be used to select specific software and operational updates on non-Windows and low-cost Internet of Things (IoT) systems.

In another exemplary embodiment, OS updates (e.g., such as Microsoft Windows Updates) may be released periodically (e.g., monthly). In such a case, system is left off for over a month, there are likely several OS Updates available, that require download, install, and system reboot. A time gap typically exists, however, in the time between when the user restarts and boots the system and the time that the OS updates are downloaded, installed, and the system again restarted. During this time gap, a conventional information handling system accessing the Internet may be susceptible to the as-yet unpatched vulnerabilities. Thus, in this embodiment, BMU 266 may send a message to an OS agent executing on host 205 alerting it to the fact that the system has been off for an extended period of time greater than a defined duration threshold (e.g., 30 days). In response, the OS agent may change the system firewall settings such that no network traffic is allowed across network 312 except to download any needed OS update/s (which would not be done in the absence of the message from BMU 266). Once any needed OS update/s have been downloaded, installed, and the system restarted and OS rebooted, the OS agent may then re-enable all network traffic across network 312.

In another embodiment, when system 200 is off, BMU 266 of a given battery pack 265 may be configured to detect and record (e.g., in Battery system storage 263) changes in system presence (or battery out/battery in condition), i.e., whether the battery pack 265 is connected to a system 200 or not. This system presence information may be detected (e.g., by monitoring the electrical state of, or data passed across, battery pack terminals 193 such as in the form of a system present signal toggle), and may be recorded on battery system storage 263 to be used by a programmable integrated circuit of BMU 266 to determine (or count) the number of times the battery pack 265 has been swapped, or removed and replaced. For the case of a non-replaceable (or captured) battery pack, this recorded system presence information may be used to determine whether the system 200 was disassembled and worked on (or tampered with) while either retaining the original battery pack 265 or inserting a new battery pack 265 and connecting it to the power terminals of the system 200. In one embodiment, the nature of this battery swap/removal/replacement event may be provided to OS 308 on the next reboot after it occurs, and this information then used by OS 308 to trigger a modified system behavior on the next boot event, e.g., including running pre-boot diagnostics and/or informing remote support and/or data collection 314 via network 312 that the battery swap/removal/replacement event has occurred, e.g., for purposes of warranty or service analysis. In another embodiment, information about battery swap may be alternatively or additionally obtained by host processing components of system 200 by reading electronic piece part identification ("eppid") from the BMU 266 of a connected battery pack 265 that includes the given battery pack serial number. Eppid may be stored in storage 263 or other memory of battery BMU 266 and may be accessible by a host programmable integrated circuit such as CPU 205 when the battery is connected and the CPU 205 us powered on. A change in eppid may be used by CPU 205 to detect a battery pack swap/exchange event when a new battery part number is detected. In one embodiment, a change in battery eepid is not data logged by either the CPU 205 or the battery 265 when the CPU 205 of system 200 is unpowered.

Figure 5:
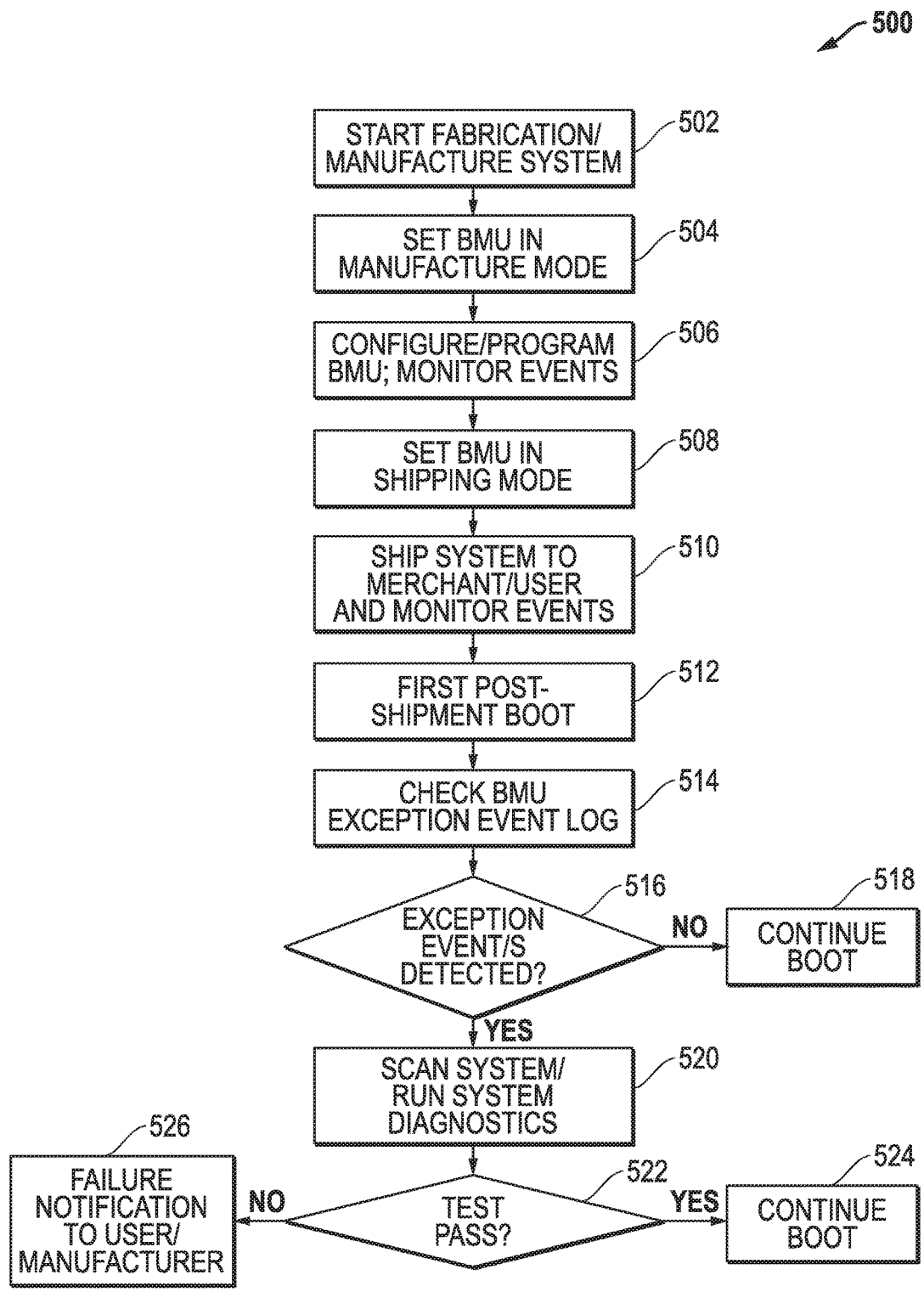
FIG. 5 illustrates methodology according to one exemplary embodiment of the disclosed systems and methods.

In another embodiment illustrated in methodology 500 of FIG. 5, BMU data collection may be enabled and ON while system 200 is built and shipped to an end customer. Methodology 500 starts in step 502 where system fabrication/manufacture is begun in a factory or assembly plant. During manufacture, BMU 266 may be powered ON with at least partially charged battery cell/s 291 and set in manufacture mode in step 504 to allow programming and configuration of BMU (e.g., firmware, storage, etc.) in conjunction with other components of system 200 in step 506. During step 506, sensed and tracked exception events that occur during manufacture may also be recorded on storage 263 as events by BMU 266. Prior to shipping out the completed system 200, BMU 266 may be set in shipping mode in which it is powered ON condition using power supplied from at least partially charged battery cell/s 291 (e.g., at least 60% charged battery cell/s 291 when system 200 leaves the factory or assembly plant). System 200 may then be shipped (e.g., via rail, truck, ship airplane, etc.) in step 510 to an end user directly or via one or more wholesaler or retailer facilities. During shipment of step 510, any sensed or tracked exception events that occur during transportation may be recorded on storage 263 as events by BMU 266.

Still referring to FIG. 5, in step 512 a first post-shipment system boot may occur, e.g., initiated by an end user. In step 514, any recorded BMU exception events may be provided from BMU 266 to host programmable integrated circuit 205 as a BMU exception event log that includes any identified exception events. In step 516, system BIOS or other logic on host 205 may then detect the presence of any exception events recorded in the BMU exception event log that have previously occurred during manufacture and/or shipment. In the absence of any exception events in the BMU exception event log, host 205 proceeds with normal system boot in step 518. However, if the BMU exception event log is found to contain one or more exception events in step 516, then host 205 proceeds with scanning the system and running system diagnostics in step 520 to correlate to any system issues/failures when they occur, e.g., such as in the manner described in relation to FIG. 4. In this regard, step 520 may be entered upon detection of any recorded exception events, or alternatively only upon detection of pre-designated types or severity of exception events.

As an example, when upon first system startup host 205 determines that certain exception events have occurred during manufacture and/or transportation, host 205 may boot first to pre-boot diagnostics routine (e.g., such as described in relation to FIG. 4) instead of completing out of box experience (OOBE). In any case, if the diagnostic testing passes in step 522, then normal system boot is continued in step 524 by host 205. However, if diagnostic testing fails in step 522, then one or more actions may be taken in step 526, e.g., displaying a failure notification (optionally with identity of failure cause and corresponding exception event/s) to the user on display 225 and/or sending a failure notification (optionally with identity of failure cause and corresponding exception event/s) to remote support and/or data collection 314 via network 312, e.g., to assist a system manufacture, fabricator or supplier with corrective support and warranty claims, and/or to allow collection of manufacture and/or transportation failure data to correct problems occurring in the manufacturing and/or shipping procedures.

As an example, assume that a computer fabricator or supplier ships systems via a northern cold climate railway. Depending on time of the year, the shipment route is exposed to extreme low temperatures that may affect the life of components in the system. A BMU 266 of a battery pack 265 may log low temperature exposure during system OFF condition, and the resulting low temperature exception events may be correlated to any issues or diagnosed failures that that occur upon first system boot. In this regard, low temperatures and rail transportation is more conducive to transport shock and vibration and may result in electrical interconnect failures. Such conditions may be identified and corrected by the manufacturer, fabricator or supplier based on a number of reported failure events that have been correlated to the occurrence of low temperature exception events during transportation. It will be understood that the illustrated steps of methodology 500 are exemplary only, and that any other combination of additional, fewer and/or alternative steps may be employed that is suitable to monitor and record information related to environmental conditions, operating conditions and/or events to which a battery-powered information handling system has been exposed while the battery powered information handling system is being manufactured and/or shipped to an end user, and to make this information available for diagnostic use by one or more system programmable integrated circuits at a following system restart or operating system (OS) boot.

It will also be understood that one or more of the tasks, functions, or methodologies described herein for an information handling system or component thereof (e.g., including those described herein for components 205, 220, 266, 269, 283, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a programmable integrated circuit such as CPU, controller, microcontroller, microprocessor, ASIC, etc. or executed on a programmable logic device "PLD" such as FPGA, complex programmable logic device "CPLD", etc.) to perform one or more steps of the methodologies disclosed herein. In one embodiment, a group of such processors and PLDs may be programmable integrated circuits selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodologies disclosed herein. It will also be understood that one or more steps of the present methodologies may be employed in one or more code segments of the computer program. For example, a code segment executed by the information handling system may include one or more steps of the disclosed methodologies. It will be understood that a programmable integrated circuit may be configured to execute or otherwise be programmed with software, firmware, logic, and/or other program instructions stored in one or more non-transitory tangible computer-readable mediums (e.g., example, data storage devices, flash memories, random access memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A battery system, comprising:
   one or more rechargeable battery cells configured to be coupled to provide electrical current to a system load of an information handling system when the battery system is paired with the information handling system;
   a battery system storage; and
   at least one programmable integrated circuit coupled to the battery system storage and the one or more battery cells, the programmable integrated circuit of the battery system being programmed to be powered by the one or more rechargeable battery cells to perform the following while the battery system is not paired with the information handling system or while the battery system is paired with the information handling system with a host programmable integrated circuit of the information handling system in an unpowered condition:
      sense at least one of environmental conditions, operating conditions or event occurrences to which the battery system and/or the information handling system is exposed while the battery system is not paired with the information handling system or is paired with the information handling system having the unpowered host programmable integrated circuit; and
      record and store the sensed environmental conditions, operating conditions or event occurrences as stored sensed information on the battery system storage while the battery system is not paired with the information handling system or is paired with the information handling system having the unpowered host programmable integrated circuit;
   where the at least one battery system programmable integrated circuit is further programmed to later provide the previously-stored sensed information from the battery system storage that was previously recorded while the battery system was not paired with the information handling system or was paired with the information handling system having the unpowered host programmable integrated circuit to at least one programmable integrated circuit of a paired information handling system when the battery system is next paired with the information handling system having the host programmable integrated circuit in powered condition; and
   where the battery system is a smart battery pack that includes a battery management unit (BMU) coupled to a battery unit that includes the one or more rechargeable battery cells, the BMU including the battery system programmable integrated circuit and the battery system storage; and where the battery system programmable integrated circuit is configured to:
sense presence and absence of the information handling system paired to the battery system, and
record the number of times that the battery system has been paired and unpaired with an information handling system as the sensed information on the battery system storage.

2. The battery system of claim 1, further comprising one or more sensors coupled to the battery system programmable integrated circuit, and where the battery system programmable integrated circuit is programmed to use the coupled sensors to sense at least one of the environmental conditions, operating conditions or event occurrences to which the battery system is exposed while the battery system is not paired with the information handling system or is paired with the information handling system having the unpowered host programmable integrated circuit; and to record and store the sensed environmental conditions, operating conditions or event occurrences as the stored sensed information on the battery system storage.

3. The battery system of claim 2, where the one or more sensors comprise at least one of a temperature sensor, voltage sensor, charging current sensor, a discharge current sensor, an accelerometer, a relative humidity sensor, or a global positioning system (GPS) sensor.

4. The battery system of claim 1, where the programmable integrated circuit of the battery system is further programmed to be powered by the one or more rechargeable battery cells to perform the following while no external charge source is present:
sense at least one of environmental conditions, operating conditions or event occurrences to which the battery system and/or information handling system is exposed while the battery system is not paired with the information handling system or is paired with the information handling system having an unpowered host programmable integrated circuit; and
record and store the sensed environmental conditions, operating conditions or event occurrences as stored sensed information on the battery system storage while the battery system is not paired with the information handling system or is paired with the information handling system having the unpowered host programmable integrated circuit.

5. A battery system, comprising:
one or more rechargeable battery cells configured to be coupled to provide electrical current to a system load of an information handling system when the battery system is paired with the information handling system;
a battery system storage; and
at least one programmable integrated circuit coupled to the battery system storage and the one or more battery cells, the programmable integrated circuit of the battery system being programmed to be powered by the one or more rechargeable battery cells to perform the following while the battery system is not paired with the information handling system or while the battery system is paired with the information handling system with a host programmable integrated circuit of the information handling system in an unpowered condition:
sense at least one of environmental conditions, operating conditions or event occurrences to which the battery system and/or the information handling system is exposed while the battery system is not paired with the information handling system or is paired with the information handling system having the unpowered host programmable integrated circuit; and
record and store the sensed environmental conditions, operating conditions or event occurrences as stored sensed information on the battery system storage while the battery system is not paired with the information handling system or is paired with the information handling system having the unpowered host programmable integrated circuit;
where the at least one battery system programmable integrated circuit is further programmed to later provide the previously-stored sensed information from the battery system storage that was previously recorded while the battery system was not paired with the information handling system or was paired with the information handling system having the unpowered host programmable integrated circuit to at least one programmable integrated circuit of a paired information handling system when the battery system is next paired with the information handling system having the host programmable integrated circuit in powered condition;
where the battery system is configured to be paired with the information handling system with the one or more battery cells coupled to provide electrical current to a system load contained within a chassis enclosure of the paired information handling system; where the battery system programmable integrated circuit is configured to be coupled to one or more sensors of the information handling system that are external to the battery system and that are attached internal to and within the chassis enclosure of the paired information handling system with the one or more external sensors being disposed outside of and not part of the battery system; and where the battery system programmable integrated circuit is programmed to:
use the external sensors of the information handling system to sense at least one environmental condition within the chassis enclosure of the information handling system, and
record and store the sensed environmental condition as the stored sensed information on the battery system storage; and
where the battery system is configured to power the one or more external sensors of the information handling system to sense the at least one environmental condition within the chassis enclosure of the information handling system while the battery system is paired with the information handling system host programmable integrated circuit in an unpowered state.

6. The battery system of claim 5, where the battery system is a smart battery pack that includes a battery management unit (BMU) coupled to a battery unit that includes the one or more rechargeable battery cells; and where the BMU includes the battery system programmable integrated circuit and the battery system storage.

7. An information handling system, comprising:
a system load including a host programmable integrated circuit programmed to execute an operating system for the information handling system;
a battery system paired with the information handling system, the battery system being separate from the system load and comprising:

one or more rechargeable battery cells coupled to provide electrical current to the system load of the information handling system, battery system storage, and at least one programmable integrated circuit coupled to the battery system storage and the one or more battery cells;

where the programmable integrated circuit of the battery system is programmed to be powered by the one or rechargeable battery cells to perform the following while the battery system is not paired with the information handling system or while the battery system is paired with the information handling system with the host programmable integrated circuit in an unpowered condition:

sense at least one of environmental conditions, operating conditions or event occurrences to which the battery system and/or the information handling system is exposed while the battery system is not paired with the information handling system or is paired with the information handling system having the unpowered host programmable integrated circuit; and record and store the sensed environmental conditions, operating conditions or event occurrences as stored sensed information on the battery system storage while the battery system is not paired with the information handling system or is paired with the information handling system having the unpowered host programmable integrated circuit;

where the battery system programmable integrated circuit is further programmed to later provide the previously-stored sensed information from the battery system storage that was previously recorded while the battery system was not paired with the information handling system or was paired with the information handling system having the unpowered host programmable integrated circuit to at least one programmable integrated circuit of the information handling system the next time the host programmable integrated circuit is placed in powered condition while the battery system is paired with the information handling system;

where the information handling system further comprises:

a chassis enclosure containing the system load with the one or more battery cells being coupled to provide electrical current to the system load within the information handling system chassis enclosure, and one or more sensors external to the battery system that are attached internal to and within the chassis enclosure of the information handling system with the one or more external sensors being disposed outside of and not part of the battery system, the one or more sensors being coupled to provide signals to the battery system programmable integrated circuit;

where the battery system programmable integrated circuit is programmed to:

use the external sensors of the information handling system to sense at least one environmental condition within the chassis enclosure of the information handling system, and record and store the sensed environmental condition as the stored sensed information on the battery system storage; and where the battery system is configured to power the one or more external sensors of the information handling system to sense the at least one environmental condition within the chassis enclosure of the information handling system while the battery system is paired with the information handling system host programmable integrated circuit in an unpowered state.

8. The information handling system of claim 7, where the battery system further comprises one or more battery system sensors inside the battery system and coupled to the battery system programmable integrated circuit, and where the battery system programmable integrated circuit is programmed to use the coupled battery system sensors to sense at least one of environmental conditions, operating conditions or event occurrences to which the battery system is exposed while the battery system is not paired with the information handling system or is paired with the information handling system having the unpowered host programmable integrated circuit; and to record and store the sensed environmental conditions, operating conditions or event occurrences sensed by the battery system sensors as the stored sensed information on the battery system storage.

9. The information handling system of claim 8, where the one or more battery system sensors comprise at least one of an accelerometer, a relative humidity sensor, or a global positioning system (GPS) sensor.

10. The information handling system of claim 7, where the programmable integrated circuit of the battery system is further programmed to be powered by the one or more rechargeable battery cells to perform the following while no external charge source is present:

sense at least one of environmental conditions, operating conditions or event occurrences to which the battery system and/or information handling system is exposed while the battery system is not paired with the information handling system or is paired with the information handling system having the unpowered host programmable integrated circuit; and record and store the sensed environmental conditions, operating conditions or event occurrences as stored sensed information on the battery system storage while the battery system is not paired with the information handling system or is paired with the information handling system having the unpowered host programmable integrated circuit.

11. An information handling system, comprising:

a system load including a host programmable integrated circuit programmed to execute an operating system for the information handling system;

a battery system paired with the information handling system, the battery system being separate from the system load and comprising:

one or more rechargeable battery cells coupled to provide electrical current to the system load of the information handling system, a battery system storage, and at least one programmable integrated circuit coupled to the battery system storage and the one or more battery cells;

where the programmable integrated circuit of the battery system is programmed to be powered by the one or rechargeable battery cells to perform the following while the battery system is not paired with the information handling system or while the battery system is paired with the information handling system with the host programmable integrated circuit in an unpowered condition:

sense at least one of environmental conditions, operating conditions or event occurrences to which the battery system and/or information handling system is exposed; and record the sensed environmental conditions, operating conditions or event occurrences as sensed information on the battery system storage; and where the battery system programmable integrated circuit is further programmed to provide the sensed information from the battery system storage to at least one programmable integrated circuit of the information handling system the next time the host programmable integrated circuit is placed in powered condition while the battery system is paired with the information handling system; and where the programmable integrated circuit of the battery system is programmed to provide the sensed information from the battery system storage to the host programmable integrated circuit of the information handling system the next time the host programmable integrated circuit is placed in powered condition to boot the operating system with the battery system paired with the information handling system; and where the host programmable integrated circuit is configured to:

analyze the sensed information provided from the battery system storage, determine a boot sequence for the operating system based on the analysis of the sensed information provided from the battery system storage, the determined boot sequence being one of at least a normal boot sequence to the operating system, or a modified boot sequence that includes execution of a pre-boot diagnostic routine prior to attempting to boot the operating system, and then proceed with the determined boot sequence.

12. The information handling system of claim 11, where the battery system programmable integrated circuit is programmed to record the sensed information to include any sensed event occurrences to which at least one of the battery system or information handling system is exposed while the host programmable integrated circuit is in an unpowered condition; where at least one of the host programmable integrated circuit or the battery system programmable integrated circuit is programmed to determine a severity of any event occurrences to which the battery system or information handling system is exposed while the host programmable integrated circuit is in an unpowered condition; and where the host programmable integrated circuit is configured to:

determine the boot sequence for the operating system based on the presence and determined severity of any sensed event occurrences, the determined boot sequence being one of:

a normal boot sequence to the host operating system where either no event occurrences or low severity event occurrences are sensed, or a modified boot sequence that includes execution of a pre-boot diagnostic routine prior to attempting to boot the operating system where high severity event occurrences are sensed; and then proceed with the determined boot sequence;

where the host programmable integrated circuit is further configured to not boot to the host operating system when the pre-boot diagnostic routine is executed and fails.

13. The information handling system of claim 12, where the host programmable integrated circuit is further programmed to analyze any sensed low severity event occurrences after the normal boot sequence is completed; and to generate an alert to report any low severity event occurrences to a local operating system level support application executing on the host programmable integrated circuit and/or to a remote support and/or data collection application executing on a remote server coupled to the information handling system by a network.

14. An information handling system, comprising:

a system load including a host programmable integrated circuit programmed to execute an operating system for the information handling system;

a battery system paired with the information handling system, the battery system being separate from the system load and comprising:

one or more rechargeable battery cells coupled to provide electrical current to the system load of the information handling system, a battery system storage, and at least one programmable integrated circuit coupled to the battery system storage and the one or more battery cells;

where the programmable integrated circuit of the battery system is programmed to be powered by the one or rechargeable battery cells to perform the following while the battery system is not paired with the information handling system or while the battery system is paired with the information handling system with the host programmable integrated circuit in an unpowered condition:

sense at least one of environmental conditions, operating conditions or event occurrences to which the battery system and/or information handling system is exposed; and record the sensed environmental conditions, operating conditions or event occurrences as sensed information on the battery system storage; and where the battery system programmable integrated circuit is further programmed to provide the sensed information from the battery system storage to at least one programmable integrated circuit of the information handling system the next time the host programmable integrated circuit is placed in powered condition while the battery system is paired with the information handling system; and where the battery system programmable integrated circuit is programmed to be powered by one or more battery cells while the host programmable integrated circuit is in an unpowered condition to power the battery system programmable integrated circuit to record the elapsed time since the host programmable integrated circuit was last in a powered condition as the sensed information; and where the host programmable integrated circuit is programmed to determine a post-boot operation after booting the host operating system for the first time after the host programmable integrated circuit is placed in powered condition with the battery system paired to the information handling system based on the recorded elapsed time, the post boot operation comprising at least one of:

prioritizing at least one defined software update for the information handling system if the elapsed time exceeds a predefined time threshold, the defined software update comprising a virus signature definition for anti-virus software executing on the host programmable integrated circuit, or changing a firewall setting for the host programmable integrated circuit to limit network traffic to the information handling system if the elapsed time exceeds a predefined time threshold so as to only allow operating system updates until any needed operating system updates have been downloaded and installed, and the operating system has been rebooted.

15. A method, comprising operating at least one programmable integrated circuit of a battery system having one or more rechargeable battery cells to:
perform the following steps while the battery system is not paired with an information handling system or while the battery system is paired with the information handling system with a host programmable integrated circuit of the information handling system in an unpowered condition:
sense at least one of environmental conditions, operating conditions or event occurrences to which the battery system and/or the information handling system is exposed while the battery system is not paired with the information handling system or is paired with the information handling system having the unpowered host programmable integrated circuit; and
record and store the sensed environmental conditions, operating conditions or event occurrences as stored sensed information on storage of the battery system while the battery system is not paired with an information handling system or is paired with the information handling system having the unpowered host programmable integrated circuit; and
then later provide the previously-stored sensed information from the battery system storage that was previously recorded while the battery system was not paired with the information handling system or was paired with the information handling system having the unpowered host programmable integrated circuit to at least one programmable integrated circuit of the information handling system when the battery system is next paired with the information handling system with the host programmable integrated circuit in powered condition;
where the battery system is a smart battery pack that includes a battery management unit (BMU) coupled to a battery unit that includes the one or more rechargeable battery cells, the BMU including the battery system programmable integrated circuit and the battery system storage; and where the method further comprises using the battery system programmable integrated circuit to:
sense presence and absence of the information handling system paired to the battery system, and
record the number of times that the battery system has been paired and unpaired with an information handling system as the sensed information on the battery system storage.

16. The method of claim 15, further comprising using the battery system programmable integrated circuit to use one or more coupled sensors to sense at least one of the environmental conditions, operating conditions or event occurrences to which the battery system is exposed while the battery system is not paired with the information handling system or is paired with the information handling system having the unpowered host programmable integrated circuit; and to record and store the sensed environmental conditions, operating conditions or event occurrences as the stored sensed information on the battery system storage; where the sensed environmental conditions, operating conditions or event occurrences comprise at least one of battery temperature, battery cell voltage, battery cell charging current, battery cell discharge current, acceleration, relative humidity, or global positioning system (GPS) coordinates.

17. The method of claim 15, further comprising operating the at least one programmable integrated circuit of the battery system to perform the following steps while no external charge source is present:
sense at least one of environmental conditions, operating conditions or event occurrences to which the battery system and/or information handling system is exposed while the battery system is not paired with the information handling system or is paired with the information handling system having the unpowered host programmable integrated circuit; and
record and store the sensed environmental conditions, operating conditions or event occurrences as stored sensed information on storage of the battery system while the battery system is not paired with the information handling system or is paired with the information handling system having the unpowered host programmable integrated circuit.

18. The method of claim 15, further comprising using the battery system programmable integrated circuit to use one or more coupled sensors to sense at least one of the environmental conditions, operating conditions or event occurrences to which the battery system is exposed while the battery system is not paired with the information handling system or is paired with the information handling system having the unpowered host programmable integrated circuit; and to record and store the sensed environmental conditions, operating conditions or event occurrences as the stored sensed information on the battery system storage; where the sensed environmental conditions, operating conditions or event occurrences comprise at least one of acceleration, relative humidity, or global positioning system (GPS) coordinates.

19. A method, comprising operating at least one programmable integrated circuit of a battery system having one or more rechargeable battery cells to:
perform the following steps while the battery system is not paired with an information handling system or while the battery system is paired with the information handling system with a host programmable integrated circuit of the information handling system in an unpowered condition:
sense at least one of environmental conditions, operating conditions or event occurrences to which the battery system and/or information handling system is exposed; and
record the sensed environmental conditions, operating conditions or event occurrences as sensed information on storage of the battery system; and
then provide the sensed information from the battery system storage to at least one programmable integrated circuit of the information handling system when the battery system is next paired with the information handling system with the host programmable integrated circuit in powered condition; and
where the method further comprises providing the sensed information from the battery system storage to the host programmable integrated circuit of the information handling system the next time the host programmable integrated circuit is placed in powered condition to boot the operating system with the battery system paired with the information handling system; and using the host programmable integrated circuit to:
analyze the sensed information provided from the battery system storage, determine a boot sequence for the operating system based on the analysis of the sensed information provided from the battery system storage, the determined boot sequence being one of at least a normal boot sequence to the operating system, or a modified boot sequence that includes execution of a pre-boot diagnostic routine prior to attempting to boot the operating system, and then proceed with the determined boot sequence.

20. The method of claim 19, further comprising:

operating the battery system programmable integrated circuit in a manufacturing mode to allow programming and configuration of the battery system programmable integrated circuit during manufacture or fabrication;

then operating the battery system programmable integrated circuit in a shipping mode powered by the one or rechargeable battery cells to:

sense at least one of environmental conditions, operating conditions or event occurrences to which the battery system is exposed while the battery system is not paired with the information handling system, and record the sensed environmental conditions, operating conditions or event occurrences as sensed information on the battery system storage while the battery system is not paired with the information handling system; and then pairing the battery system with the information handling system;

then placing the at least one programmable integrated circuit of the paired information handling system in powered condition; and then using the at least one programmable integrated circuit of the paired information handling system to:

analyze the sensed information provided from the battery system storage, determine a boot sequence for an operating system of the paired information handling system based on the analysis of the sensed information provided from the battery system storage, the determined boot sequence being one of at least a normal boot sequence to the operating system, or a modified boot sequence that includes execution of a pre-boot diagnostic routine prior to attempting to boot the operating system, and then proceed with the determined boot sequence.

21. The method of claim 19, further comprising:

using the battery system programmable integrated circuit to record the sensed information to include any sensed event occurrences to which at least one of the battery system or information handling system is exposed while the host programmable integrated circuit is in an unpowered condition information;

using at least one of the host programmable integrated circuit or the battery system programmable integrated circuit to determine a severity of any event occurrences to which the battery system or information handling system is exposed while the host programmable integrated circuit is in an unpowered condition; and using the host programmable integrated circuit to determine the boot sequence for the operating system based on the presence and determined severity of any sensed event occurrences, the determined boot sequence being one of:

a normal boot sequence to the host operating system where either no event occurrences or low severity event occurrences are sensed, or a modified boot sequence that includes execution of a pre-boot diagnostic routine prior to attempting to boot the operating system where high severity event occurrences are sensed; and then using the host programmable integrated circuit to either proceed with the determined boot sequence if the pre-boot diagnostic routine passes, or to not boot to the host operating system if the pre-boot diagnostic routine fails.

22. A method, comprising operating at least one programmable integrated circuit of a battery system having one or more rechargeable battery cells to:

perform the following steps while the battery system is not paired with an information handling system or while the battery system is paired with the information handling system with a host programmable integrated circuit of the information handling system in an unpowered condition:

sense at least one of environmental conditions, operating conditions or event occurrences to which the battery system and/or information handling system is exposed; and record the sensed environmental conditions, operating conditions or event occurrences as sensed information on storage of the battery system; and then provide the sensed information from the battery system storage to at least one programmable integrated circuit of the information handling system when the battery system is next paired with the information handling system with the host programmable integrated circuit in powered condition; and where the method further comprises using the battery system programmable integrated circuit to: sense presence and absence of a paired information handling system, and record when the battery system is paired and unpaired with the information handling system as the sensed information on the battery system storage; and then placing the host programmable integrated circuit in powered condition with the battery system paired with the information handling system, and then using the at least one programmable integrated circuit of the information handling system to implement a modified boot sequence instead of a normal boot sequence if the sensed information indicates that the battery system has been unpaired from the information handling system load at least one time, where the modified boot sequence comprises at least one of executing a pre-boot diagnostic routine prior to attempting to boot an operating system of the information handling system or providing the sensed information that the battery system has been unpaired from the information handling system load to a remote support and/or data collection application executing on a remote server coupled to the information handling system by a network.

23. A method, comprising operating at least one programmable integrated circuit of a battery system having one or more rechargeable battery cells to:

perform the following steps while the battery system is not paired with an information handling system or while the battery system is paired with the information handling system with a host programmable integrated circuit of the information handling system in an unpowered condition:

sense at least one of environmental conditions, operating conditions or event occurrences to which the battery system and/or information handling system is exposed; and record the sensed environmental conditions, operating conditions or event occurrences as sensed information on storage of the battery system; and then provide the sensed information from the battery system storage to at least one programmable integrated circuit of the information handling system when the battery system is next paired with the information handling system with the host programmable integrated circuit in powered condition; and where the method further comprises: while the host programmable integrated circuit is in an unpowered condition, using the rechargeable battery cells to power the battery system programmable integrated circuit to record the elapsed time since the host programmable integrated circuit was last in a powered condition as the sensed information; then placing the host programmable integrated circuit in powered condition with the battery system paired with the information handling system; and then after booting the host operating system for the first time after the host programmable integrated circuit is placed in powered condition, using the host programmable integrated circuit to determine a post-boot operation based on the recorded elapsed time since the host programmable integrated circuit was last in a powered condition, the post boot operation comprising at least one of:

prioritizing at least one defined software update for the information handling system if the elapsed time exceeds a predefined time threshold, the defined software update comprising a virus signature definition for anti-virus software executing on the host programmable integrated circuit, or changing a firewall setting for the host programmable integrated circuit to limit network traffic to the information handling system if the elapsed time exceeds a predefined time threshold so as to only allow operating system updates until any needed operating system updates have been downloaded and installed, and the operating system has been rebooted.

\* \* \* \* \*